United States Patent
Cantero Clares et al.

(10) Patent No.: US 12,033,266 B2
(45) Date of Patent: Jul. 9, 2024

(54) METHOD AND COMPUTER DEVICE FOR GENERATING A SIDE-BY-SIDE 3D IMAGE

(71) Applicant: Acer Incorporated, New Taipei (TW)

(72) Inventors: Sergio Cantero Clares, New Taipei (TW); Wen-Cheng Hsu, New Taipei (TW); Shih-Hao Lin, New Taipei (TW); Chih-Haw Tan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 127 days.

(21) Appl. No.: 18/055,910

(22) Filed: Nov. 16, 2022

(65) Prior Publication Data

US 2024/0161381 A1    May 16, 2024

(51) Int. Cl.
*G06T 15/04* (2011.01)
*G06T 7/50* (2017.01)
*G06T 17/20* (2006.01)
*G06T 19/20* (2011.01)

(52) U.S. Cl.
CPC ............ *G06T 15/04* (2013.01); *G06T 7/50* (2017.01); *G06T 17/20* (2013.01); *G06T 19/20* (2013.01); *G06T 2219/2012* (2013.01)

(58) Field of Classification Search
CPC ........... G06T 15/04; G06T 7/50; G06T 17/20; G06T 19/20; G06T 2219/2012
See application file for complete search history.

(56) References Cited

U.S. PATENT DOCUMENTS

2012/0182403 A1*  7/2012  Lange ............... H04N 13/128
                                                    348/51

OTHER PUBLICATIONS

Wang, N., Zhang, Y., Li, Z., Fu, Y., Liu, W., & Jiang, Y. G. (2018). Pixel2mesh: Generating 3d mesh models from single rgb images. In Proceedings of the European conference on computer vision (ECCV) (pp. 52-67).*
Naik, D. (2017). 3D Mesh Simplification Techniques for Enhanced Image Based Rendering (Master's thesis).*

* cited by examiner

*Primary Examiner* — Sarah Lhymn
(74) *Attorney, Agent, or Firm* — McClure, Qualey & Rodack, LLP

(57) ABSTRACT

A computer-executable method for generating a side-by-side three-dimensional (3D) image includes the steps of creating a 3D mesh and estimating depth information of the raw image. The method further includes the steps of updating the left mesh area and the right mesh area of the 3D mesh based on the estimated depth information of the raw image and projecting each of the mesh vertices of the left mesh area onto a coordinate system of the side-by-side 3D image based on a left eye position, and projecting each of the mesh vertices of the right mesh area onto the coordinate system of the side-by-side 3D image based on a right eye position. The method further obtains the side-by-side 3D image by coloring the left mesh area and the right mesh area projected onto the coordinate system of the side-by-side 3D image based on the raw image.

8 Claims, 4 Drawing Sheets

400

METHOD AND COMPUTER DEVICE FOR GENERATING A SIDE-BY-SIDE 3D IMAGE

BACKGROUND OF THE INVENTION

Field of the Invention

The present disclosure relates in general to image processing techniques, and it relates in particular to the generation of a side-by-side 3D image.

Description of the Related Art

A side-by-side 3D image is made up of two images aligned side by side that appear to be the same but actually have slight differences, simulating the two images we see with our left and right eyes, respectively. The differences between the two images are integrated and processed by the brain to allow viewers to perceive the 3D effect.

The sided-by-side 3D image is typically displayed on a wearable device such as 3D/VR glasses or head-mounted display. In order to display sided-by-side 3D images on an autostereoscopic display device, additional techniques in the image rendering pipeline such as eye tracking and image weaving (or interlacing) are needed. In some application scenarios, such as virtual reality (VR) scenes or stereoscopic 3D gameplay, the position of the user (along with the user's eyes, of course) may change frequently and rapidly. Whenever the position of the user is changed, the scenes to be displayed will be recalculated, which consumes considerable computing resources.

In view of the problems described above, it would be desirable to have a method and computer device for generating a side-by-side 3D image more efficiently than conventional approaches.

BRIEF SUMMARY OF THE INVENTION

A method for generating a side-by-side three-dimensional (3D) image based on a raw image is provided by an embodiment of the present disclosure. The method is executed by a computer device. The method includes the step of creating a 3D mesh. The method further includes the step of estimating depth information of the raw image. The method further includes the step of updating the left mesh area and the right mesh area of the 3D mesh based on the estimated depth information of the raw image. The method further includes the step of projecting each of the mesh vertices of the left mesh area onto a coordinate system of the side-by-side 3D image based on a left eye position, and projecting each of the mesh vertices of the right mesh area onto the coordinate system of the side-by-side 3D image based on a right eye position. The method further includes the step of obtaining the side-by-side 3D image by coloring the left mesh area and the right mesh area projected onto the coordinate system of the side-by-side 3D image based on the raw image.

In some embodiments, the step of creating the 3D mesh includes creating a texture of a triangle formed by three of the mesh vertices that are adjacent to one another.

In some embodiments, the step of obtaining the side-by-side 3D image by coloring the left mesh area and the right mesh area projected onto the coordinate system based on the raw image includes interpolating color textures of the raw image on the left mesh area and the right mesh area projected onto the coordinate system of the side-by-side 3D image.

A computer device for generating a side-by-side three-dimensional (3D) image is provided by an embodiment of the present disclosure. The computer device includes a central processing unit (CPU) and a graphics processing unit (GPU). The CPU is configured to run a program to request the GPU to execute the steps of the method described above.

The method and the computer device of the present disclosure provides a novel image processing technique to generate the side-by-side image by rendering both left and right views simultaneously on the same mesh, instead of rendering twice for the left eye and the right eye separately and then aligning them. By loading the resources (e.g., the mesh model, the depth information, the color texture, etc.) in GPU only once, the number of CPU calls can be saved. Additionally, the likelihood of synchronization issues between CPU calls and hardware execution can be reduced.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

Figure 1:
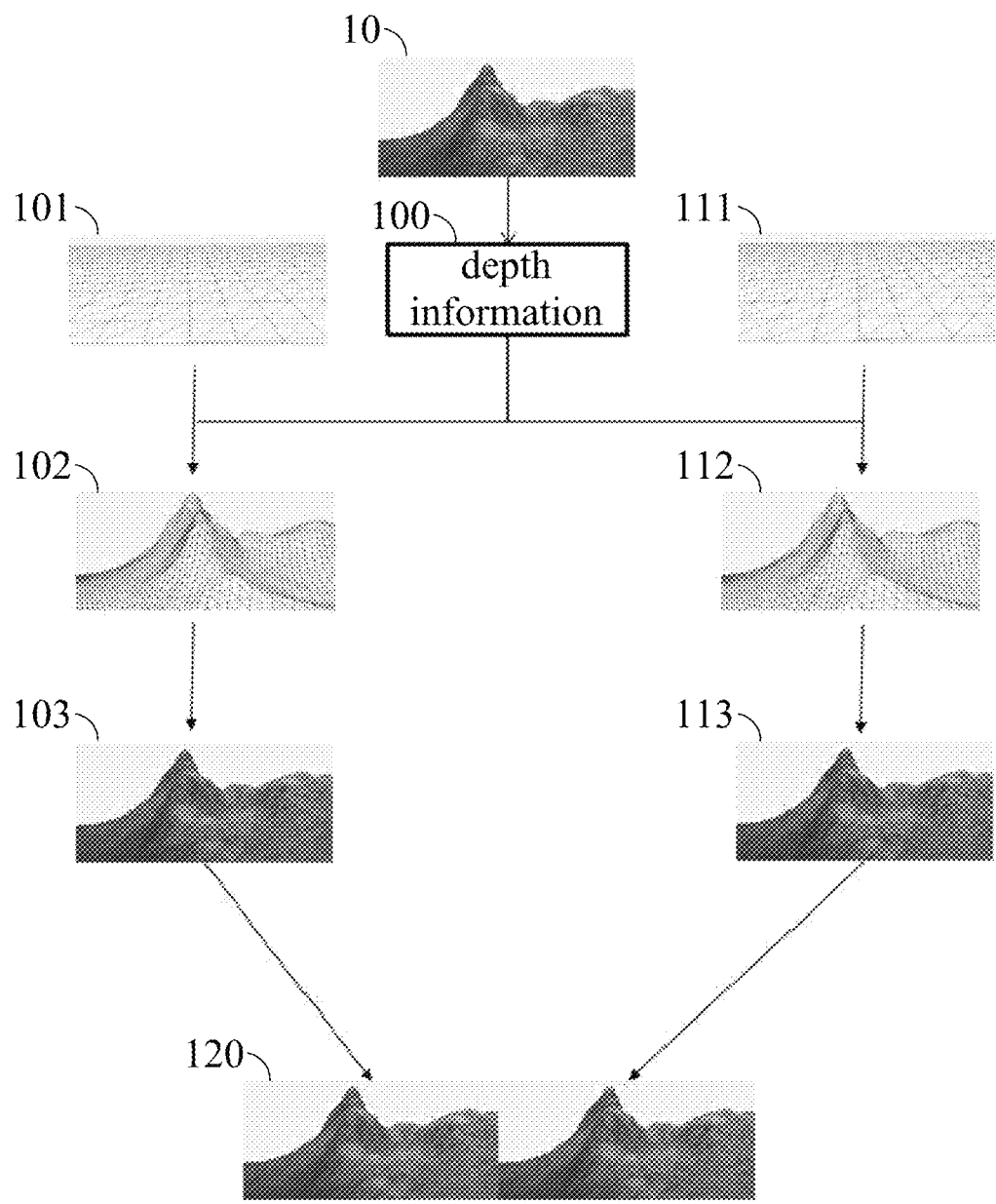
FIG. 1 is a schematic diagram showing the concept of a conventional approach for generating the side-by-side 3D image.

FIG. 1 is a schematic diagram illustrating the conceptual flow of an exemplary conventional approach for generating the side-by-side 3D image 120. In the illustrated example, a mesh model is used for defining the shape and the depth of the object (e.g., the mountain) in the image.

As shown in FIG. 1, the mesh 101 is created including a plurality of triangles (can be replaced with other types of polygons) arranged in sequence on the X-Y plane, and each triangle has a set of vertices. The mesh 101 will be updated to the updated mesh 102 by giving the vertices of each triangle in the mesh 101 a specific height (i.e., the scale along the Z-axis direction) which is determined by the depth information 100 captured from the raw image 10 and stored in the depth buffer (also known as the "z-buffer"). Then, the left eye image 103 (i.e., the view for the left eye of humans) is generated by coloring the triangles in the updated mesh 102. Likewise, the mesh 111 is created including a plurality of triangles (can be replaced with other types of polygons) arranged in sequence on the X-Y plane, and each triangle has a set of vertices. The mesh 111 will be updated to the updated mesh 112 by giving the vertices of each triangle in the mesh 111 a specific height (i.e., the scale along the Z-axis direction) which is determined by the depth information 100 captured from the raw image 10 and stored in the depth buffer. Then, the right eye image 113 (i.e., the view for the right eye of humans) is generated by coloring the triangles in the updated mesh 112 based on the color texture of the raw image 10. The left eye image 103 and the right eye image 113 appear to be the same but actually have slight differences. Finally, the single side-by-side 3D image 120 is generated by aligning the left eye image 103 and the right eye image 113 side by side. The left part of the side-by-side 3D image 100 is from the left eye image 103, while the right part of the side-by-side 3D image 100 is from the right eye image 113.

As it can be seen in FIG. 1, the side-by-side 3D image 120 is generated through drawing the scene twice, once for each eye, meaning that some resources used for drawing the side-by-side 3D image 120 will be twice than drawing each of the left eye image 103 and the right eye image 113. For example, the mesh 101 and 111 are created using the same mesh model, so the mesh model is loaded from the memory twice. The depth information 100 of the raw image 10 required for obtaining the updated meshes 102 and 112 are the same, but it is loaded from the depth buffer twice, once for each of the updated meshes 102 and 112. The color texture (e.g., the RGB value of each pixel) of the raw image 10 required for obtaining the left eye image 103 and the right eye image 113 is also loaded from the memory twice, once for each of the updated meshes 102 and 112.

Figure 2:
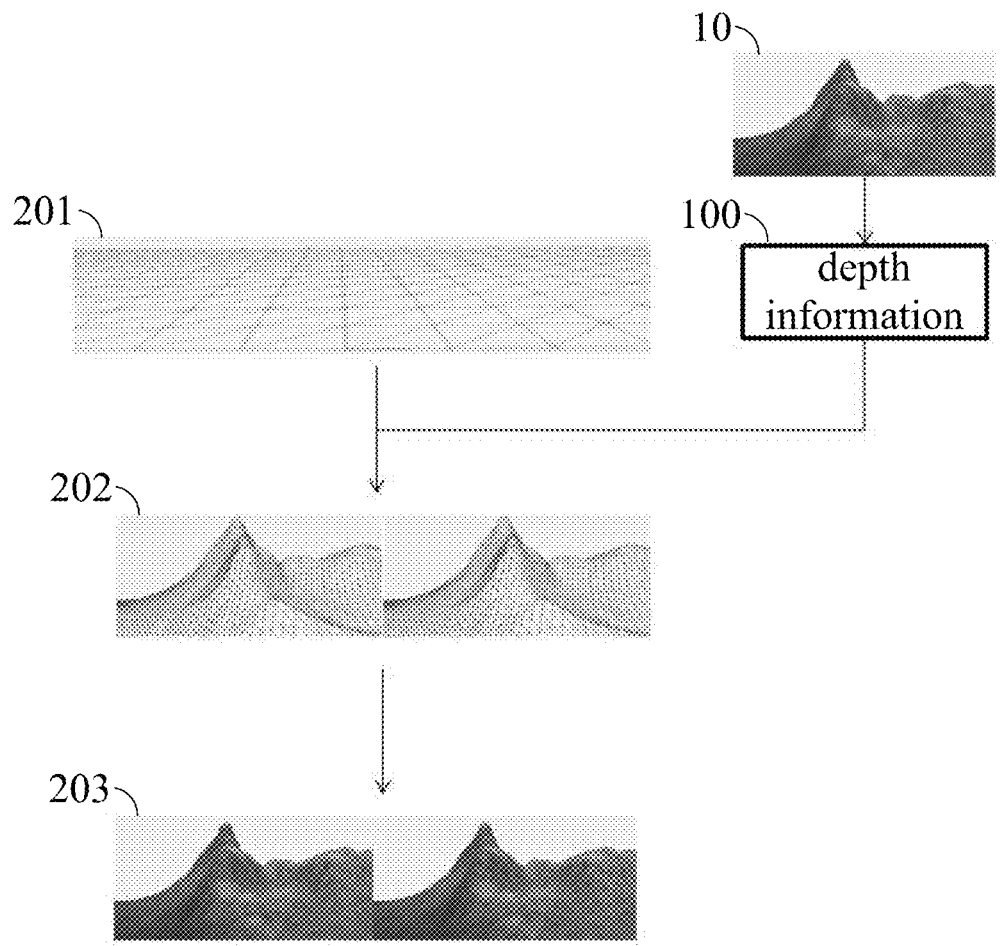
FIG. 2 is a schematic diagram showing the concept of generating the side-by-side 3D image, according to an embodiment of the present disclosure.

FIG. 2 is a schematic diagram illustrating the conceptual flow of generating the side-by-side 3D image 203, according to an embodiment of the present disclosure. In this example, the mesh 201 is a larger mesh created with substantially twice the width than the meshes 101 and 111. The depth information 100 of the raw image 10 required for updating the mesh 201 to the updated mesh 202 is the same as used for obtaining the updated mesh 102 or 112. The left and the right part of the updated mesh 201 are prepared for the left eye and the right eye respectively. Thus, the side-by-side 3D image 203 can be obtained by directly coloring the left and right part of the single updated mesh 202, without needing to draw the left eye image and the right eye image separately and then align them. As a result, resources such as the mesh model, the depth information 100 and the color texture of the raw image 10 are loaded only once instead of being loaded twice.

Figure 3:
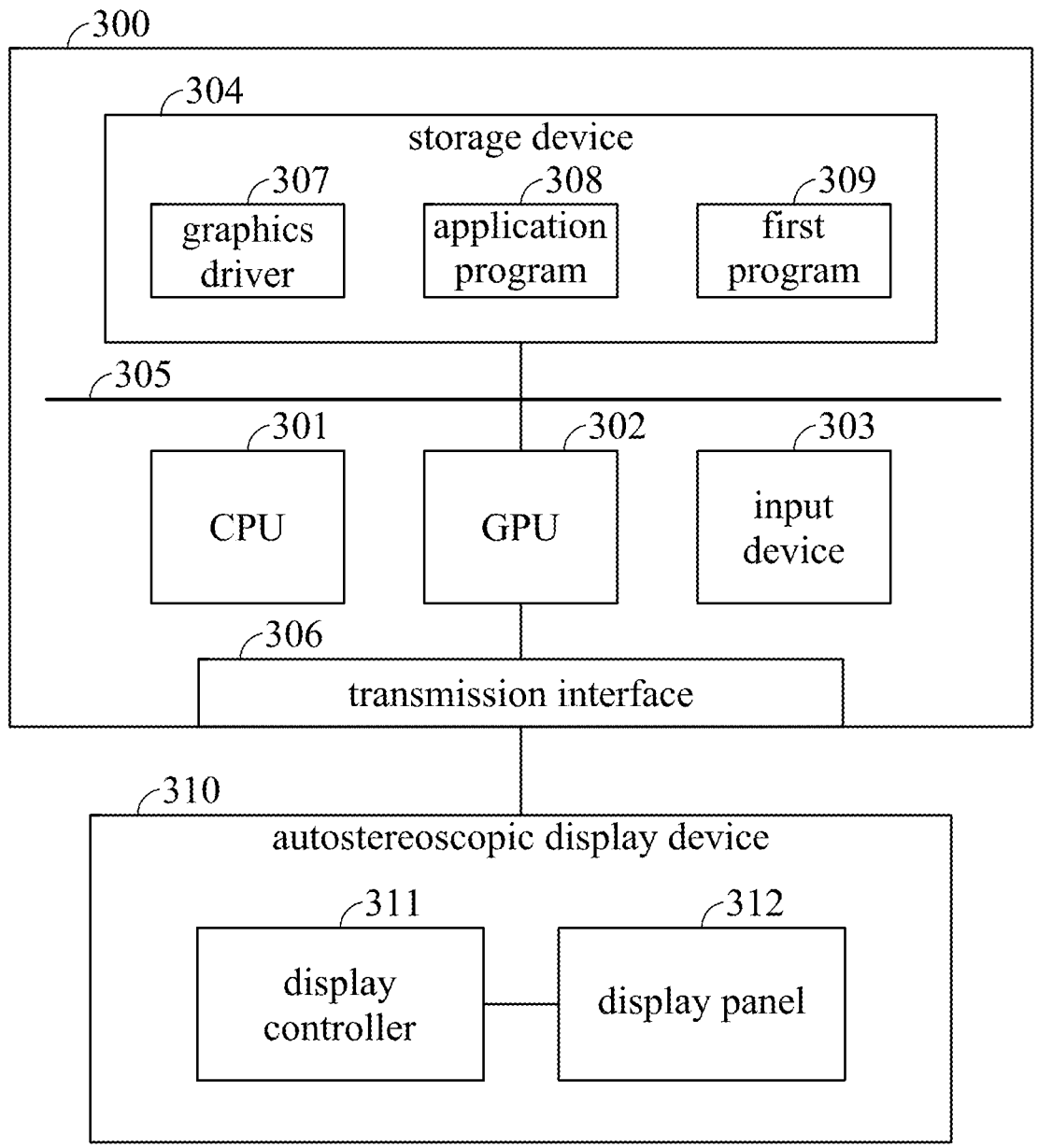
FIG. 3 is a schematic block diagram illustrating the computer device for generating a side-by-side three-dimensional (3D) image, according to an embodiment of the present disclosure.

FIG. 3 is a schematic block diagram illustrating the computer device 300 for generating a side-by-side three-dimensional (3D) image, according to an embodiment of the present disclosure. As shown in FIG. 3, elements such as the processing unit 301, the graphics processing unit (GPU) 302, the input device 303, and the storage device 304 are included in the computer device 300, and they are coupled to each other through the system bus 305.

The computer device 300 is an electronic device capable of the execution of computational tasks, such as a personal computer (including desktop computer, notebook computer, and tablet computer), or a server computer.

The central processing unit (CPU) 301 is a general-purpose processor configured to run the graphics driver 307 and the application program 308 stored in the storage device 304. According to the embodiments of the present disclosure, the processing unit 301 is further configured to run the first program 309 stored in the storage device 304 to request the GPU 304 to execute the steps the method for generating a side-by-side three-dimensional (3D) image as will be described with reference to FIG. 4.

The GPU 302 may be a specialized electronic circuit designed to execute computer graphics computing and image processing, for offloading the general-purpose central processing unit (CPU). The GPU 302 is thus more efficient than the general-purpose CPU 301 for computer graphics computing and image processing.

The input device 303 may include any device that is able to receive control commands from viewers, such as a keyboard, a mouse, and a touch panel, but the present disclosure is not limited thereto. In an embodiment, the input device 303 allows the viewer to enable/disable the 3D scene, in other words, allows the viewer to switch between the 2D mode and the 3D mode of the display. In another embodiment, the input device 303 allows the viewer to adjust (increase or decrease) the interpupillary distance (IPD) parameter settings, which is related to how the 3D mesh is projected onto the coordinate system of the side-by-side 3D image.

The storage device 304 can be a non-volatile memory device, such as a hard disk drive, a solid-state disk, a flash memory, or a read-only memory, but the present disclosure is not limited thereto. According to the embodiments of the present disclosure, the storage device 304 is used for storing the graphics driver 307, the application program 308, and the first program 309.

The graphics driver 307 is a set of software programs allowing the operating system (e.g., Windows, Linux, MacOS, etc.), on which the application program 308 is installed, to communicate with the GPU 303.

The application program 308 may be any software program providing visualized images or scenes to viewers, such as games, video/multimedia player programs, web browsers (e.g., when the viewer is using it to watch a video on an online video platform such as YouTube, or on a social media such as Twitter), photo viewing programs, or other visual entertainment applications.

In the exemplary scenario of FIG. 3, since the display device is the autostereoscopic display device 310 which presents both the left eye image and the right eye image (i.e., the first image and the second image as previously described) in the same screen, the GPU 302 is further configured to execute an interlacing (or weaving) process to generate an stereo image based on the side-by-side image (e.g., the side-by-side image 120 in FIG. 1 and the side-by-side image 203 in FIG. 2). After generating the stereo image, the GPU 302 sends the stereo image to the autostereoscopic display device 310 through the transmission interface 306.

The transmission interface 306 may include wired transmission interfaces and/or wireless transmission interfaces.

The wired transmission interfaces may include High Definition Multimedia Interface (HDMI), DisplayPort (DP) interface, embedded display Port (eDP) interface, Universal Serial Bus (USB) interface, USB Type-C interface, Thunderbolt interface, Digital Video Interface (DVI), or the combination thereof. The wireless transmission interface may include fifth generation (5G) wireless system, Bluetooth, WiFi, Near Field Communication (NFC) interface, etc., but the present disclosure is not limited thereto.

The autostereoscopic display device 310 is a display device capable of displaying stereoscopic images without the use of a wearable device (such as 3D/VR glasses or headgear) for the viewer. The autostereoscopic display device 310 may include a display controller 311 and a display panel 312. The display controller 311 is used for switching the display modes (e.g., the 2D mode and 3D mode that are allowed for viewers to switch between through the input device 303, as previously described) of the display panel 312 according to the display mode control signal from the computer device 300. The display panel 320 can achieve the effect of autostereoscopic vision using any suitable autostereoscopic technology in the field of the present disclosure, such as parallax barrier, lenticular lenses, directional backlight, integral imaging, etc., the details of which will not be elaborated here. Thereby, a stereoscopic 3D scene of the application program can be presented to the viewer by displaying the stereo image on the display panel, in response to the stereo image being received by the autostereoscopic display device 310.

Figure 4:
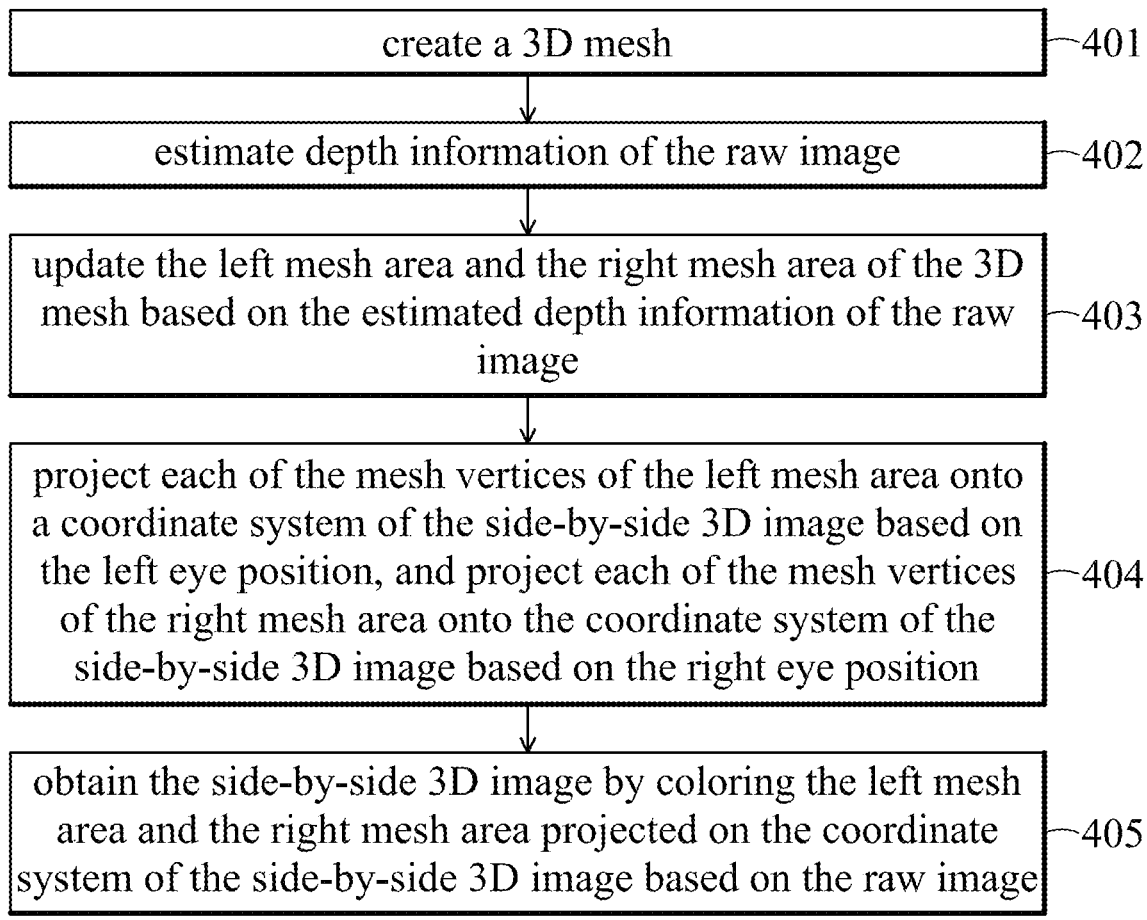
FIG. 4 is the flow diagram of the method for generating a side-by-side three-dimensional (3D) image based on a raw image, according to an embodiment of the present disclosure.

FIG. 4 is the flow diagram of the method 400 for generating a side-by-side three-dimensional (3D) image based on a raw image, according to an embodiment of the present disclosure. The method 400 can be executed by a computer device, such as the computer device 300 in FIG. 3. The CPU 301 of the computer device 300 is configured to run the first program 309 to request the GPU 302 to execute the steps of the method 400. As shown in FIG. 4, the method 400 may include steps 401-405.

In step 401, a 3D mesh (e.g., the mesh 201 in FIG. 2) is created. Then, the method 400 proceeds to step 402.

In step 402, depth information of the raw image is estimated. Then, the method 400 proceeds to step 403.

In step 403, the left mesh area and the right mesh area of the 3D mesh are updated based on the estimated depth information of the raw image. Then, the method 400 proceeds to step 404.

In step 404, each of the mesh vertices of the left mesh area is projected onto a coordinate system of the side-by-side 3D image based on the left eye position (i.e., the position of the left eye of the viewer), and each of the mesh vertices of the right mesh area is projected onto the coordinate system of the side-by-side 3D image based on the right eye position (i.e., the position of the right eye of the viewer). Then, the method 400 proceeds to step 405.

In step 405, the side-by-side 3D image is obtained by coloring the left mesh area and the right mesh area projected onto the coordinate system of the side-by-side 3D image based on the raw image.

In some embodiments, step 401 includes the operation of creating the texture of a triangle formed by three of the mesh vertices that are adjacent to one another. For example, as it can be seen in FIG. 2, the mesh 201 includes a plurality of vertices and a plurality of triangles. Each of the triangles is formed by three of the mesh vertices that are adjacent to one another, and has a corresponding texture. When the mesh being created, the texture of each of the triangles, as a type of data structure, will also be created (or initialized).

In further embodiments, the depth information can be represented in the form of a depth map, a parallax map, or a point cloud, the present disclosure is not limited thereto. The depth information can be estimated using a convolution neural network (CNN)-based model in step 402, but the present disclosure is not limited thereto.

In some embodiments, the left eye position and the right eye position used in step 404 may be measured using any known eye tracking techniques, the present disclosure is not limited thereto.

In some embodiments, step 405 may further include the operation of interpolating color textures of the raw image on the left mesh area and the right mesh area projected onto the coordinate system of the side-by-side 3D image. The color textures can be represented in a variety of formats of the color space, such as RGB, YUV, YCbCr, CMYK, sRGB, HSV, etc., the present disclosure is not limited thereto.

In some embodiments, a stereo image can be generated based on the side-by-side 3D image obtained in step 405 by executing an interlacing (or weaving) process. Then, the stereo image will be sent to an autostereoscopic display device to display the stereo image.

The steps of the methods and algorithms provided in the present disclosure may be directly applied to a hardware and a software module or a combination thereof by executing a processor. A software module (including executing instructions and related data) and other data may be stored in a data memory, such as random access memory (RAM), flash memory, read-only memory (ROM), erasable programmable read only memory (EPROM), electrically erasable programmable read only memory (EEPROM), registers, hard drives, portable drives, CD-ROM, DVD, or any other computer-readable storage media format in the art. For example, a storage media may be coupled to a machine device, such as a computer/processor (denoted by "processor" in the present disclosure, for the convenience of explanation). The processor may read information (such as codes) from and write information to a storage media. A storage media may integrate a processor. An application-specific integrated circuit (ASIC) includes the processor and the storage media. A viewer apparatus includes an ASIC. In other words, the processor and the storage media are included in the viewer apparatus without directly connecting to the viewer apparatus. Besides, in some embodiments, any product suitable for computer programs includes a readable storage media, wherein the storage media includes codes related to one or more disclosed embodiments. In some embodiments, the computer program product may include packaging materials.

The method and the computer device of the present disclosure provides a novel image processing technique to generate the side-by-side image by rendering both left and right views simultaneously on the same mesh, instead of rendering twice for the left eye and the right eye separately and then aligning them. By loading the resources (e.g., the mesh model, the depth information, the color texture, etc.) in GPU only once, the number of CPU calls can be saved. Additionally, the likelihood of synchronization issues between CPU calls and hardware execution can be reduced.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating a side-by-side three-dimensional (3D) image based on a raw image, executed by a computer device, comprising the following steps:
    creating a 3D mesh, wherein the 3D mesh comprises a left mesh area and a right mesh area, and each of the left mesh area and the right mesh area has a plurality of mesh vertices;
    estimating depth information of the raw image;
    updating the left mesh area and the right mesh area of the 3D mesh based on the estimated depth information of the raw image;
    projecting each of the mesh vertices of the left mesh area onto a coordinate system of the side-by-side 3D image based on a left eye position, and projecting each of the mesh vertices of the right mesh area onto the coordinate system of the side-by-side 3D image based on a right eye position;
    obtaining the side-by-side 3D image by coloring the left mesh area and the right mesh area projected onto the coordinate system of the side-by-side 3D image based on the raw image.

2. The method as claimed in claim 1, wherein the step of creating the 3D mesh comprises:
    creating a texture of a triangle formed by three of the mesh vertices that are adjacent to one another.

3. The method as claimed in claim 1, wherein the step of obtaining the side-by-side 3D image by coloring the left mesh area and the right mesh area projected onto the coordinate system based on the raw image comprises:
    interpolating color textures of the raw image on the left mesh area and the right mesh area projected onto the coordinate system of the side-by-side 3D image.

4. The method as claimed in claim 1, further comprising:
    generating a stereo image based on the side-by-side 3D image, and sending the stereo image to an autostereoscopic display device to display the stereo image.

5. A computer device for generating a side-by-side three-dimensional (3D) image based on a raw image, comprising a central processing unit (CPU) and a graphics processing unit (GPU), wherein the CPU is configured to run a program to request the GPU to execute the following steps:
    creating a 3D mesh, wherein the 3D mesh comprises a left mesh area and a right mesh area, and each of the left mesh area and the right mesh area has a plurality of mesh vertices;
    estimating depth information of the raw image;
    updating the left mesh area and the right mesh area of the 3D mesh based on the estimated depth information of the raw image;
    projecting each of the mesh vertices of the left mesh area onto a coordinate system of the side-by-side 3D image based on a left eye position, and projecting each of the mesh vertices of the right mesh area onto the coordinate system of the side-by-side 3D image based on a right eye position;
    obtaining the side-by-side 3D image by coloring the left mesh area and the right mesh area projected onto the coordinate system of the side-by-side 3D image based on the raw image.

6. The computer device as claimed in claim 5, wherein the step of creating the 3D mesh comprises:
    creating a texture of a triangle formed by three of the mesh vertices.

7. The computer device as claimed in claim 1, wherein the step of obtaining the side-by-side 3D image by coloring the left mesh area and the right mesh area projected onto the coordinate system based on the raw image comprises:
    interpolating color textures of the raw image on the left mesh area and the right mesh area projected onto the coordinate system of the side-by-side 3D image.

8. The computer device as claimed in claim 1, wherein the CPU is further configured to request the GPU to generate a stereo image based on the side-by-side 3D image, and to send the stereo image to an autostereoscopic display device to display the stereo image.

\* \* \* \* \*